(12) United States Patent
Uttley

(10) Patent No.: US 12,706,484 B2
(45) Date of Patent: Aug. 11, 2026

(54) WIRELESS POWER SUPPLY APPARATUS FOR AN ELECTRIC TOOTHBRUSH

(71) Applicant: Worldwisetrading Ltd, Northolt (GB)

(72) Inventor: William Uttley, London (GB)

(73) Assignee: Worldwisetrading Ltd, Northolt (GB)

( * ) Notice: Subject to any disclaimer, the term of this patent is extended or adjusted under 35 U.S.C. 154(b) by 826 days.

(21) Appl. No.: 18/023,006

(22) PCT Filed: Aug. 25, 2021

(86) PCT No.: PCT/IB2021/057779

§ 371 (c)(1),
(2) Date: Feb. 24, 2023

(87) PCT Pub. No.: WO2022/043884

PCT Pub. Date: Mar. 3, 2022

(65) Prior Publication Data

US 2023/0307952 A1 Sep. 28, 2023

(30) Foreign Application Priority Data

Aug. 26, 2020 (HK) .......................... 32020015047.4

(51) Int. Cl.
*H01M 10/46* (2006.01)
*H02J 50/00* (2016.01)
*H02J 50/10* (2016.01)

(52) U.S. Cl.
CPC ............ *H02J 50/10* (2016.02); *H02J 50/005* (2020.01); *A46B 2200/1066* (2013.01)

(58) Field of Classification Search
CPC ........ H02J 50/10; H02J 50/005; H02J 7/0044; A46B 2200/1066
USPC ................................ 320/107, 108, 114, 115
See application file for complete search history.

(56) References Cited

U.S. PATENT DOCUMENTS

| | | | |
|---|---|---|---|
| D493,136 S | 7/2004 | Since | |
| D588,985 S | 3/2009 | O'Hern | |
| D670,242 S | 11/2012 | Cobbett et al. | |
| D672,308 S | 12/2012 | Cobbett et al. | |
| D691,947 S | 10/2013 | Cole et al. | |
| 9,124,105 B2 * | 9/2015 | Gunderman | H02J 7/0044 |
| D836,547 S | 12/2018 | Uttley | |
| D884,615 S | 5/2020 | Ito et al. | |
| D887,976 S | 6/2020 | Tung et al. | |

(Continued)

FOREIGN PATENT DOCUMENTS

| | | |
|---|---|---|
| CN | 2315700 Y * | 4/1999 |
| CN | 304355728 S | 11/2017 |

(Continued)

OTHER PUBLICATIONS

International Search Report of PCT Patent Application No. PCT/IB2021/057779 issued on Dec. 1, 2021.

(Continued)

*Primary Examiner* — Edward Tso

(74) *Attorney, Agent, or Firm* — Dority & Manning, P.A.

(57) ABSTRACT

A power supply apparatus, especially one for supply charging power to an electric toothbrush, comprises a first housing portion, a power input coupler, a second housing portion having a platform comprising platform surface which projects away from the first housing portion, and a power output coupler formed on the platform. The apparatus is configured for wall mounting so that a load can be charged while supported by a wall outlet.

19 Claims, 5 Drawing Sheets

(56) References Cited

U.S. PATENT DOCUMENTS

Figure 1:
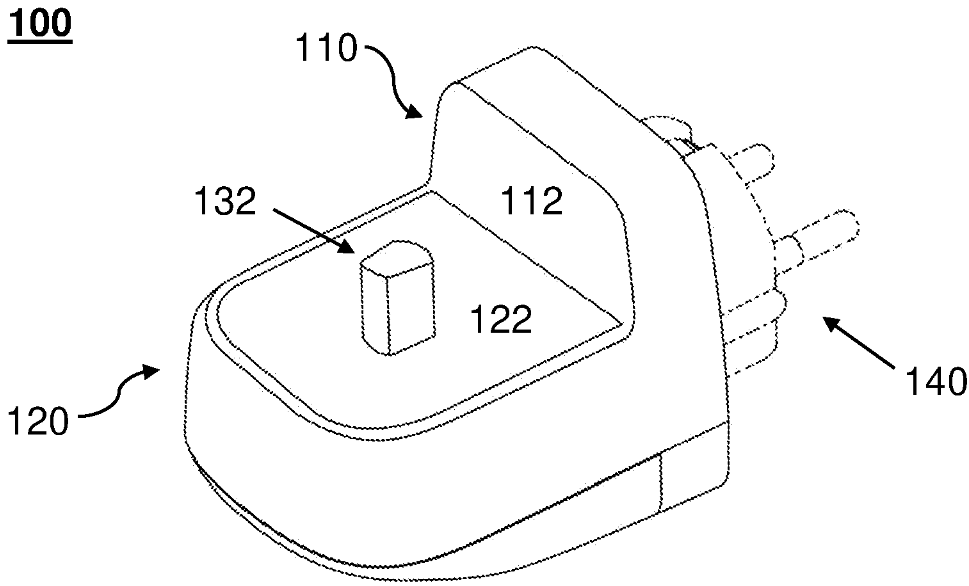

| | | | | |
|---|---|---|---|---|
| D937,204 | S | 11/2021 | Okai et al. | |
| D940,074 | S | 1/2022 | Bae et al. | |
| D965,521 | S | 10/2022 | Zhu | |
| D978,074 | S | 2/2023 | Kiveläet al. | |
| D1,032,504 | S | 6/2024 | Graber et al. | |
| D1,057,654 | S | 1/2025 | Chen | |
| D1,072,732 | S | 4/2025 | Huang et al. | |
| D1,074,592 | S | 5/2025 | Ma | |
| 2003/0098669 | A1 | 5/2003 | Hensel | |
| 2005/0269987 | A1* | 12/2005 | Lin | H02J 7/0042 320/115 |
| 2012/0139484 | A1 | 6/2012 | Gunderman et al. | |
| 2014/0042963 | A1* | 2/2014 | Yu | H02J 50/10 320/108 |
| 2014/0354219 | A1 | 12/2014 | Fan | |
| 2020/0179090 | A1 | 6/2020 | Copeland et al. | |
| 2023/0187951 | A1* | 6/2023 | Oyler | H02J 50/10 320/107 |

FOREIGN PATENT DOCUMENTS

| | | |
|---|---|---|
| CN | 308787641 S | 8/2024 |
| CN | 309003559 S | 12/2024 |
| DE | 202012001639 U1 | 3/2012 |
| EM | 002088740-0005 | 8/2012 |
| GB | 6276425 | 5/2023 |
| GB | 6399608 | 10/2024 |
| GB | 6399609 | 10/2024 |
| GB | 6429413 | 3/2025 |

OTHER PUBLICATIONS

International Preliminary Report on Patentability of PCT Application No. PCT/IB2021/057779 on Feb. 28, 2023.

Examination report of European Patent Application No. 21766222.0 issued on Nov. 21, 2024.

ProofVision in Wall Electric Toothbrush Charger Polished Steel Finish. In-Wall Electric Toothbrush Charger, no more messy wires. Bathroom goals. Compatible with Oral B & Braun electric toothbrushes., Mar. 25, 2020 https://www.amazon.co.uk/ProofVision-Electric-Toothbrush-Compatible-toothbrushes/dp/B086C5YWKD.

ProofVision Electric Toothbrush Wall Charger for EU Socket for Oral-B/Brown, Nov. 17, 2022 https://www.amazon.com.au/ProofVision-Electric-Toothbrush-Charger-Socket/dp/B0BLVKCW76.

* cited by examiner

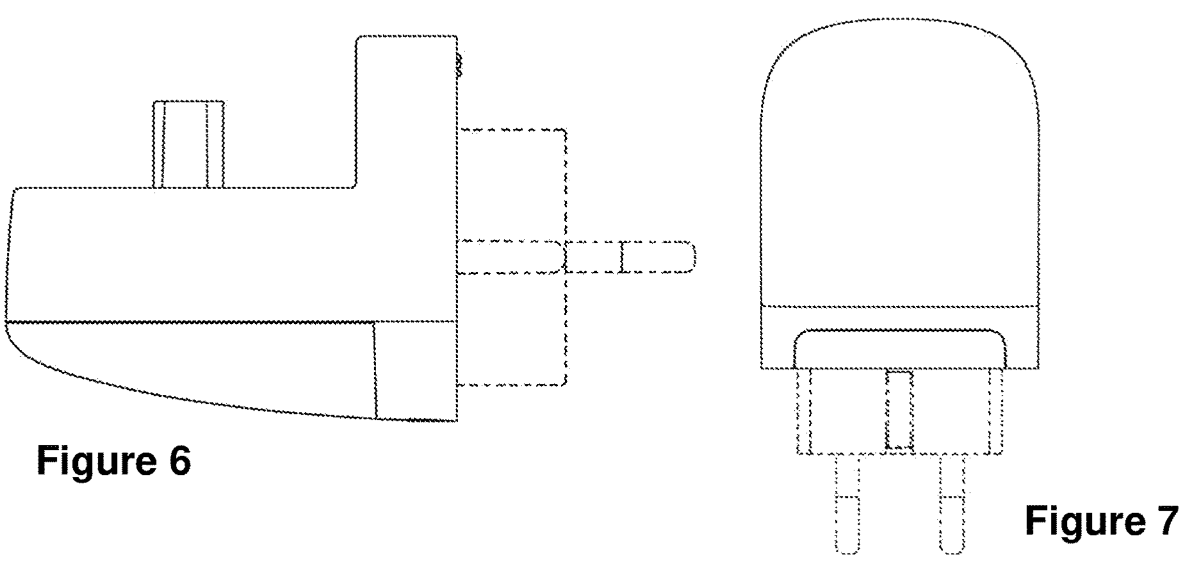
Figure 6
Figure 7
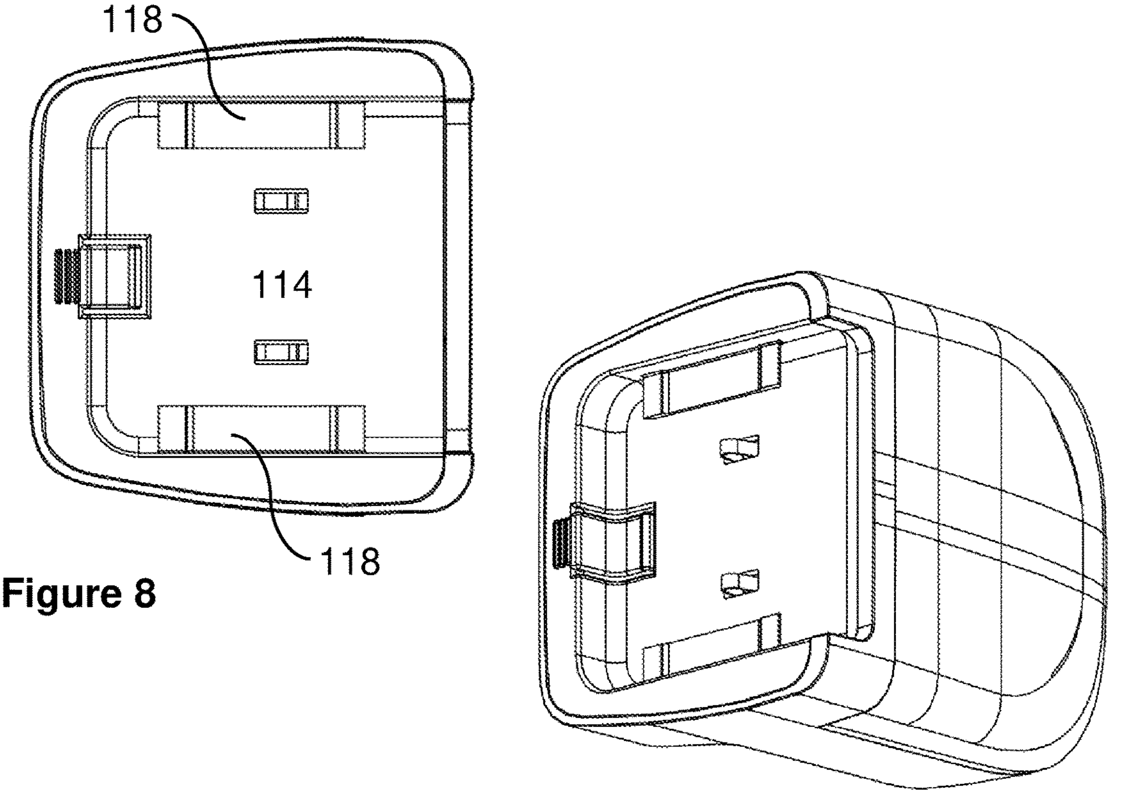
Figure 8
Figure 9

WIRELESS POWER SUPPLY APPARATUS FOR AN ELECTRIC TOOTHBRUSH

FIELD

The present disclosure relates to power supply apparatuses, and more particularly to power supply apparatus for supplying power to portable appliances such as electric toothbrushes.

BACKGROUND

Many portable electrical appliances are cordless appliances powered by rechargeable batteries. The rechargeable batteries are usually housed inside a main housing of the appliance and requires battery charging, for example, wireless charging, from time to time. Power supply apparatuses configured to provide charging power to portable electrical appliances are widely available. Improved power supply apparatus suitable for charging portable electrical appliances are advantageous and desirable.

DISCLOSURE

A power supply apparatus comprising a main housing which comprises a first housing portion and a second housing portion, a first power coupler for receiving input power from a power supply, a second power coupler for wirelessly outputting power, and electronic circuitry housed inside the main housing is disclosed.

The first housing portion is intermediate the second housing portion and the first power coupler. The first power coupler is configured to enter into physical and electrical connection with a power outlet to receive input power by moving in a first direction to approach the power outlet. The first power coupler may be a power plug having a plurality of pins projecting away from the first housing portion or a power socket having receptacles inside the first housing portion and extending in a direction opposite to the first direction.

The first power coupler is configured to cooperate with a power outlet so that the second housing is elevated in a cantilever configuration above a base surface when the power input coupler is attached to a wall-mounted power outlet.

The second housing portion comprises a platform which is configured for supporting an electrical load and an internal compartment in which the second power coupler is housed. The platform defines the ceiling of the internal compartment and has an upper platform surface which is parallel to the first direction. The upper platform surface extends away from the first power coupler (and the power outlet when connected) such that the second housing portion and the first power coupler are on opposite sides of the first housing portion.

The first power coupler is a power input coupler which may be configured to provide mechanical support to support the weight of the apparatus and the load thereon when the first power coupler is attached to a wall outlet such as a wall socket.

The first power coupler and the first housing portion are configured to cooperate to support the second housing portion to project away from the first housing portion, to elevate the apparatus in a cantilever configuration to overhang a base surface, and to maintain the platform surface horizontally, when the power input coupler is attached to a wall-mounted power outlet.

The first power coupler may be fixedly formed with, for example integrally formed, or may be detachably attached to the first housing portion.

The electronic circuitry interconnects the first power coupler and the second power coupler and is configured for converting input power into output power which is suitable for wireless transfer across the second housing portion.

The electronic circuitry typically comprises a power processing circuit which is configured to process the input power and generate an alternating electromagnetic field at an alternating frequency or a plurality of frequencies. The second housing portion is configured such that the alternating electromagnetic field is to pass through the second housing portion to reach a load which seats on the second housing portion.

The second power coupler is a power output coupler which may be configured to facilitate wireless power transfer across the second housing portion.

To facilitate wireless power transfer across the second housing portion, the electronic circuitry may comprise an output coil having a winding axis and a magnetic core which extends along the winding axis and about which windings of the output coil are wound.

In example embodiments, the winding axis is orthogonal to the first direction, and the magnetic core as part of the second power coupler protrudes from an upper platform surface on the second housing portion and extends for a vertical distance above a platform surface of the second housing portion. The magnetic core is surrounded or enclosed by a portion of the second housing portion which is a hollow portion made of a magnetic permeable material so that power carrying electromagnetic field generated by the processing circuit can be wirelessly coupled to a load in proximity to the second power coupler.

The hollow portion protrudes from the upper platform surface and extends to a height such that the upper end of the hollow portion ends at below the height of the first housing portion. In example embodiments, the hollow portion ends at below half the height of the first housing portion.

The hollow portion and the platform are integrally formed of a water-proof material such as hard plastics.

The apparatus is compact and advantageous and requires no flexible cable to interconnect a charging dock and a power outlet.

The wall mounting arrangement is advantages to mitigate wetting of the apparatus when working in a wet environment due to its elevation above a base surface.

FIGURES

Figure 2:
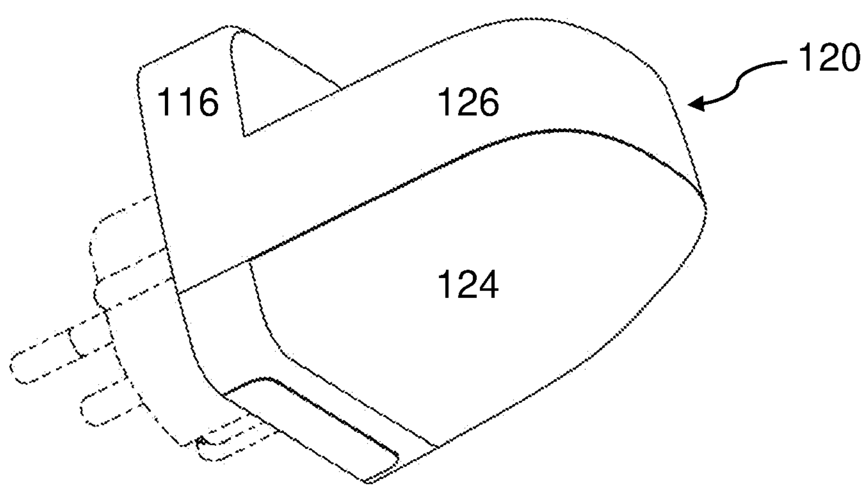
Figure 3:
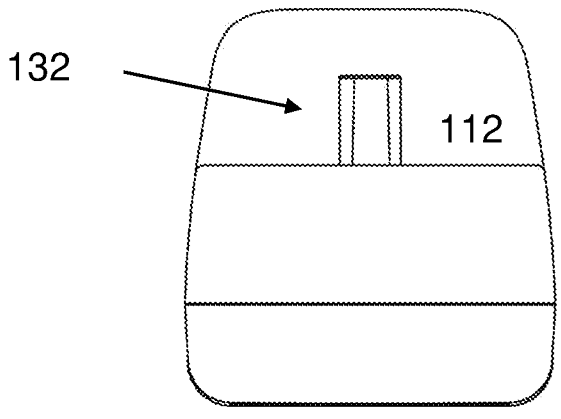
Figure 4:
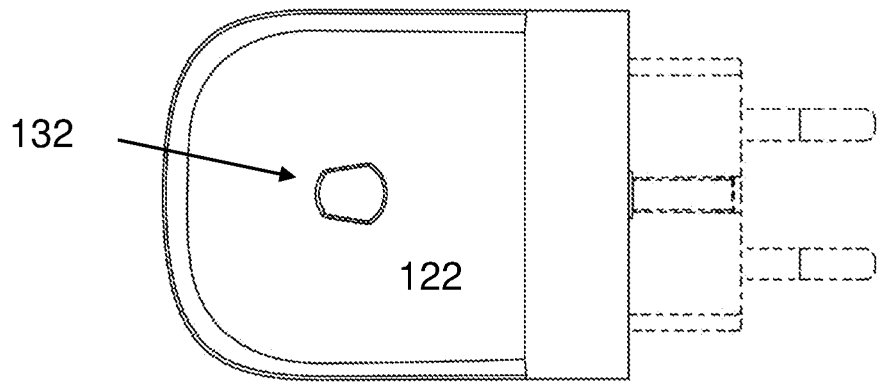
Figure 5:
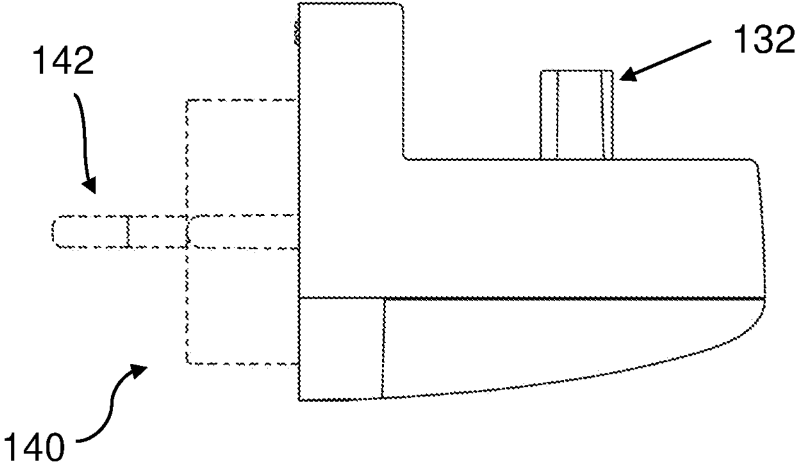
Figure 10:
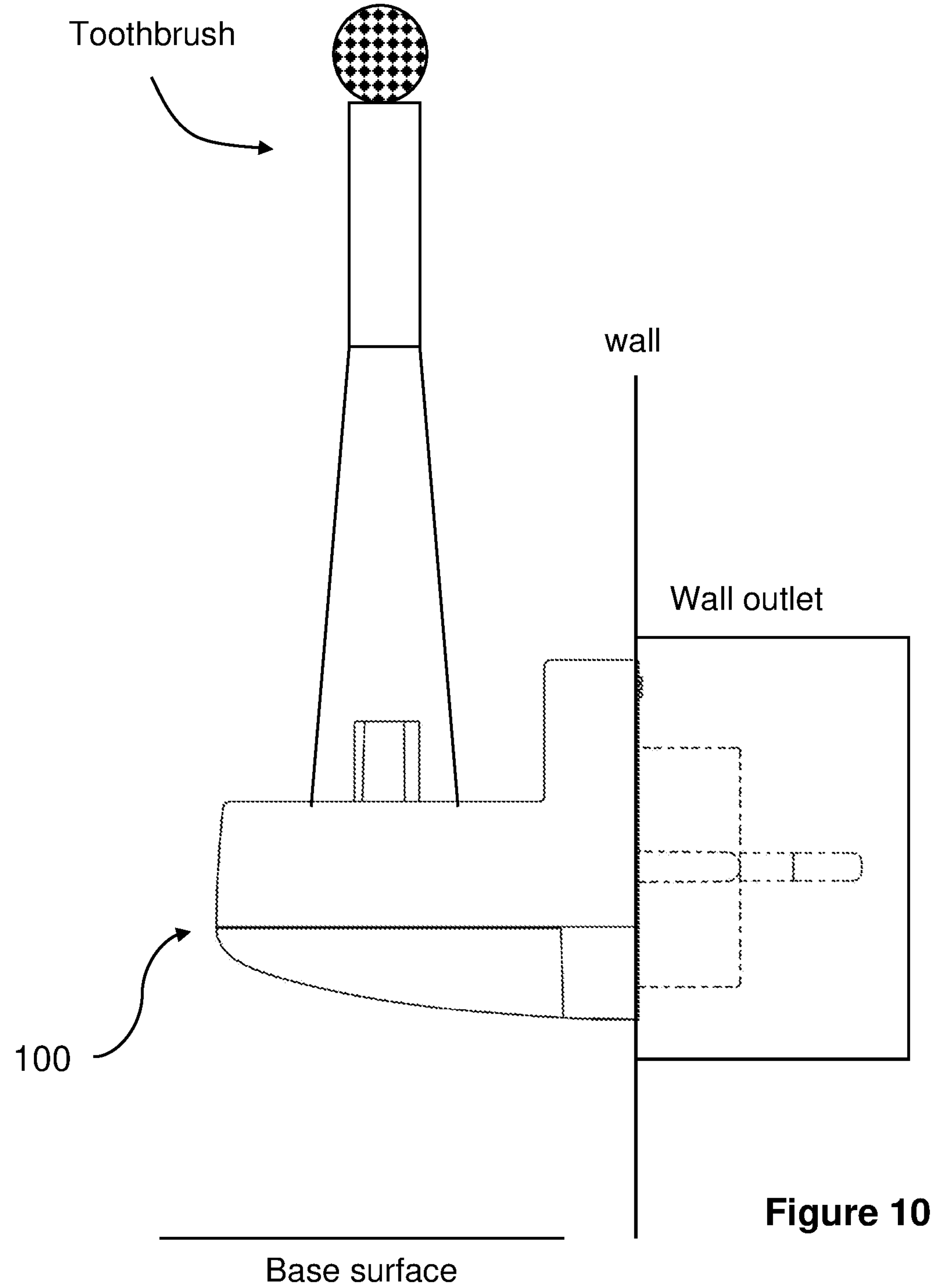
Figure 11:
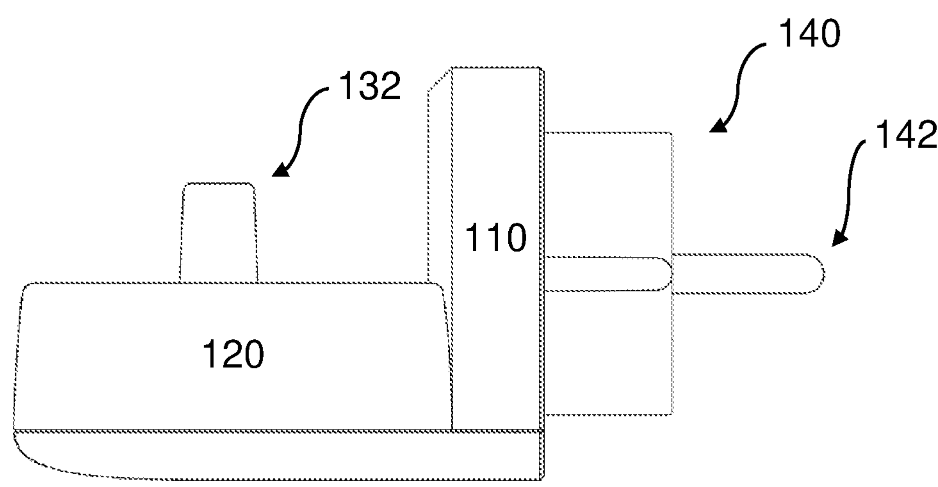

The present disclosure is made by way of example and described with reference to the accompanying figures, in which:

FIG. 1 is a front perspective view of an example power supply apparatus according to the disclosure, FIG. 2 is a rear perspective view of the example apparatus of FIG. 1, FIG. 3 is a front elevation view of the example apparatus of FIG. 1, FIG. 4 is a top plan view of the example apparatus of FIG. 1, FIGS. 5 and 6 are side elevation views of the example apparatus of FIG. 1, FIG. 7 is a bottom elevation view of the example apparatus of FIG. 1, FIGS. 8 and 9 are respectively rear and rear perspective views of the example apparatus of FIG. 1 with the power input coupler removed, FIG. 10 is a schematic diagram showing a toothbrush on the example apparatus of FIG. 1 configured as a toothbrush charger, FIG. 11 are views showing a variation embodiment of the example apparatus of FIG. 1.

DESCRIPTION

An example power supply apparatus 100 comprises a main housing, a power input coupler, a power output coupler, and electronics connected between the power input coupler and the power output coupler, as shown in FIGS. 1 to 9.

The apparatus is configured for attaching to a power source wherefrom operation power of the apparatus is received. The power source may be a standard mains AC power outlet or other types of power outlets available from time to time without loss of generality. Example standard mains AC power outlets which are currently used in the world are shown and described in Wikipedia: at https://en.wikipedia.org/wiki/AC power plugs and sockets. A power outlet is usually configured in the form of a power socket and the power input coupler is configured as a power plug compatible with the power socket. In some embodiments, the power outlet is configured as a power plug and the power input coupler is configured as a power socket compatible with the power plug. In example embodiments, the power outlet is configured as a wireless power outlet to facilitate wireless power output in which case the power outlet and the power input coupler may have a power coupling surface, for example, a closed power coupling surface, which is not in the form of a plug or a socket.

The power input coupler 140 is configured for coupling to an external power source to receive input power for operating the electronics and for output. The power output coupler is configured for outputting power to a load when a load coupled to the power output coupler. The electronics are connected to the power input coupler to receive input power for operation of the apparatus, and may comprise power conversion electronics to convert input power into output power for coupling to the load.

The main housing comprises a first housing portion 110 on which the power input coupler is disposed and a second housing portion 120 on which the power output coupler is disposed. The first housing portion is a portion of the main housing which is most proximal to a power outlet and/or the surface on which the power outlet is disposed when the apparatus is attached to the power outlet during use. In example embodiments, the first housing portion is configured to be in abutment with the power outlet and/or the surface on which the power outlet is disposed. More specifically, the first housing portion comprises a first surface 112 which is a front surface which is proximal to and in abutment with the second housing portion, and a second surface 114 which is a back surface which is configured to oppositely face and/or in abutment with the power outlet and/or the surface on which the power outlet is disposed when the apparatus is in use. The first housing portion includes a peripheral wall 116 interconnecting its front and back surfaces and defining its thickness. In example embodiments, the front surface, the back surface, and the peripheral wall cooperate to define a power coupler receptacle. Optionally, the back surface of the first housing portion is in abutment with the power outlet and/or the surface on which the power outlet is mounted.

The second housing portion 120 is in abutment with the first housing portion and projects away from the first housing portion. More specifically, the second housing portion projects away from the first housing portion 110 and extends away from the power input coupler 140 such that the first housing portion is intermediate the second housing portion and the power outlet when the power input coupler is use and attached to the power outlet to couple power therefrom. In example embodiments, the main housing is configured for palm holding and is palm-sized.

In example embodiments, the second housing portion comprises an upper panel having an upper surface 122, a lower panel having a lower surface 124 and a peripheral wall 126 interconnecting the upper panel and the lower panel to define an internal compartment. The upper panel defines a platform having a platform surface which is the upper surface of the upper panel. The platform surface is configured for coupling of power between the apparatus and the load during exemplary operations. The lower surface defines a bottom surface which is configured to be in contact with a horizonal surface and support the weight of the apparatus when the apparatus is freely placed on the support surface.

The platform surface projects away from the first housing portion and is configured to support a load when the load is attached to the apparatus to receive power during use. During example power transfer operations, a load is to rest or sit on the platform surface and power coupling is to take place between the apparatus and the load across the platform surface.

An example platform includes a forward end which is a free end and a rearward end which is in abutment with the first housing portion, and more particularly in abutment with the front surface of the first housing portion. Optionally, the platform surface and the bottom surface are configured such that the platform surface is horizontal when the bottom surface sits on a horizontal supporting surface and supports the weight of the apparatus and the load thereon. In example embodiments, the front surface of the first housing portion is orthogonal to the platform surface. In example embodiments, the first housing portion 110 and the second housing portion 120 cooperate to form an L-shaped main housing.

The main housing and the power input coupler 140 are configured such that the first housing portion is intermediate the second housing portion and the power outlet, with the second housing portion projecting away from the power outlet and the first housing portion, when the power input coupler 140 is attached to a power outlet. In example embodiments, the platform surface is supported and maintained as a horizontal support surface which projects away from a wall on which a wall-mounted power outlet ("wall outlet" in short) when the power input coupler is attached to the wall outlet. In some embodiments, the platform surface may be an inclined surface and the load may be held on the platform surface by magnetic force or by a retention mechanism such as a latching mechanism.

The apparatus may be wall-mounted or may rest on a base surface. When the apparatus rests on a base surface, for example, a horizonal support surface, the bottom surface of the apparatus is in abutment with the base surface as a support surface, the combined weight of the apparatus and the load is supported by the base surface, and the load is held upright and projects vertically away from the platform surface and away from the support surface.

When the apparatus is wall mounted, for example, when the power input coupler is attached to a wall outlet, the apparatus is elevated above a base surface and its weight is no longer supported by the base surface. When the apparatus is wall mounted, the second housing portion cantilevers and project away from first housing portion and the wall to overhang the base surface.

The first housing portion and the second housing portion are configured such that the weight of the second housing portion is supported solely by the first housing portion. The first housing portion and the power input coupler are configured such that where a load is carried on the second housing portion, the combined weight of the second housing portion and the load is supported solely by the first housing portion, which is in turn supported by the power input coupler in cooperation with the wall outlet. Since the wall outlet is disposed on a wall, the combined weight is in effect supported by the wall.

In example embodiments, the platform surface is in abutment with the first housing portion and projects at an angle, for example at right angle, away from the first housing portion.

The internal compartment of the second housing portion is configured to house the electronics, or a substantial portion thereof. The electronics comprises a plurality of current input terminals which is configured as a power input. The power input is connected to the power input coupler to receive input power. The electronics may comprise a power conversion circuitry which is configured to convert or regulate input power into a power suitable for output to the load. The power conversion circuitry is connected to the power input coupler via the power input and comprises a plurality of current output terminals which is configured as a power output for outputting power to the power output coupler.

The electronics may comprise peripheral circuits such as sensing circuits, regulating circuits, and/or indicator circuits without loss of generality. To cater for use in wet or human environments, the main housing, and more particularly the second housing portion may be configured to be water-proof or water-tight. In example embodiments, the first housing portion and the second housing portion are integrally joined.

In example embodiments, the power conversion circuitry comprises a primary winding and a transformer core. The primary winding has a current input which is configured as a pair of current input terminals connected to the power input coupler. In example embodiments, the pair of current input terminals is also the power input of the apparatus. The transformer core typically comprises a magnetic core including a first limb on which the primary winding is wound and a second limb which is in magnetic communication with the first limb and which is configured for making magnetic coupling with a secondary winding on a load. The primary winding, the secondary winding and the transformer core cooperate to form a transformer in which the secondary winding is detachable from the primary winding and the magnetic core to facilitate wireless power transfer (WPT) between the apparatus and the load. Usually, the transformer is a step-down transformer with an output voltage significantly lower than the input voltage.

In example embodiments, the second limb protrudes above the platform surface such that the magnetic core forming the second limb is surrounded by a magnetic permeable housing, such as a plastic housing, to facilitate field coupling across the platform surface. The magnetic permeable housing is preferably integrally formed with the upper panel of the second housing portion to enhance water-tightness. The magnetic permeable housing is made of an electrical insulator such as hard plastics to provide magnetic permeability and electrical insulation at the same time. The magnetic permeable housing may be configured as a stud 132, for example, a hard-plastic stud, which projects vertically above the platform surface and extending away from the second housing portion. The stud 132 is a hollow housing portion inside which a magnetic core is housed. The magnetic core is surrounded by an output coil of the power processing circuit and extends along a winding axis of the output coil.

In addition to facilitating wireless power transfer between the apparatus and a load, the hard-plastic stud also serves to maintain the load in horizontal position relative to the platform when the load rests on a horizontal platform surface. More specifically, the hard-plastic stud has a stud axis which is coaxial with the core axis of the secondary winding and restricts movement of the load in radial directions with respect to the core axis when the platform surface is horizontal. A load which is compatible with this example embodiment would comprise a secondary winding which is wound about an indented housing, for example, an indented plastic housing portion formed as an axial indentation on the bottom of the load, and the plastic stud of the apparatus is configured to be received inside the plastic indentation portion of the load in a closely fitted manner to facilitate power transfer and position retention. The stud in cooperation with the platform surface defines a docking structure for holding a load on the platform surface.

In example embodiments, the second housing portion may comprise a receptacle having an indentation for receiving a power coupling portion of the load. For example, the receptacle may comprise a peripheral wall which extends downwardly from the upper panel of the second housing portion to define an indentation. The peripheral wall maybe surrounded by an electrically insulated magnetic core rising or protruding from the bottom panel and forming a second limb of the transformer. A load which is compatible with this example embodiment would comprise a secondary winding which is wound about an axially protruding tubular plastic housing formed at a bottom end of the load.

The electrically insulated stud together with the magnetic core forming the second limb of the transformer cooperate to define an example power output coupler of the apparatus.

In example embodiments, the power conversion circuitry is compatible with the Qi® standard. For example, a charging coil with windings parallel to the platform surface may be displaced immediately below the magnetically permeable platform to facilitate wireless power transfer without loss of generality.

In some embodiments, especially where the apparatus is used in dry environments, the power output coupler may be an electrical connector having exposed electrical contacts to facilitate power transfer. For example, the electrical connector may be a USB connector which is configured to mate with a counterpart connector on the load. The electrical connector may be mounted above or below the platform surface without loss of generality. The electrical connector and the platform are configured to hold the load upright when the platform surface is horizontal, similar to the arrangement in the case of power transfer through magnetic field coupling. Where the power output coupler is an electrical connector, the transformer may be replaced by a buck-boost power converter.

The power conversion circuitry comprises a plurality of power conductors which is configured as a power input to interconnect the power input coupler and the electronics to facilitate transfer of power between the power input coupler and the electronics. The plurality of power conductors extends through the first housing portion to interconnect with the power input coupler and the electronics, such as the primary winding, inside the second housing portion.

In example embodiments, the power input coupler comprises a plurality of rigid conductor pins which is configured to mate with a corresponding plurality of conductors of a power outlet to facilitate transfer of power from the power outlet to the electronics of the apparatus. The rigid conductor pin is typically configured as a metal bar for adequate robustness. In example embodiments, the plurality of rigid conductor pins projects away from the main housing and extends away from the first housing portion in a first direction which is parallel to the platform surface. In embodiments where the power outlet is a standard socket, the rigid conductor pins are dimensioned to match with the corresponding plurality of conductors of the power outlet to facilitate reliable mating engagement. Where the socket conforms to a standard, the metal pins forming the power input coupler also have dimensions and configurations conforming to that standard without loss of generality.

The power input coupler is configured to approach a power outlet in a first direction and the second housing projects away from the first housing portion in a second direction opposite to the first direction.

In example embodiments, the first housing portion extends in a third direction which is orthogonal to the first direction and the second direction to form a partition between the power output coupler and the power input coupler. The third direction is orthogonal to the platform surface and is parallel to the direction along which the height or thickness of the second housing portion is defined. The height of the second housing is defined by the separation between the platform surface and the bottom surface. When the apparatus is wall mounted, the third direction is also the vertical direction.

The partition extends in the third direction to define height of the first housing portion and the height of the first housing portion is larger than the height of the second housing portion. In example embodiments, the height of the partition is larger than the height of the second housing portion by between 20% and 100%, for example, by 20%, 30%, 40%, 50%, 60%, 70%, 80%, 90%, 100%, or more, or a range or ranges selected from a combination of any of the aforesaid values.

The partition projects beyond the platform surface and defines a splash guard between the power output coupler and the power input coupler to mitigate splashes of conductive liquid such as water into the power outlet. In example embodiments, the third direction is parallel to the axial direction of the plastic stud 132 and plastic stud is situated in front of the partition while the power input coupler and therefore the power outlet is behind the partition.

In example embodiments, the partition has an axial height exceeding the axial height of the plastic stud, the axial height being measured in an axial direction which is orthogonal to the platform surface. In example embodiments, the height of the partition is less than or equal to twice the axial height or depth of the power output coupler.

In example embodiments, the partition has a width which is larger than the width of the power input coupler, the width being measured in a direction orthogonal to the first direction and the third direction. In example embodiments, the partition has a width which is larger than the width of the power input coupler by 10%, 20%, 30%, 40%, 50%, 60%, 70%, 80%, 90%, 100%, or more, or a range or ranges selected from a combination of any of the aforesaid values.

In example embodiments, the platform surface has a width which is comparable or equal to the width of the partition. For example, the width of the platform surface may be larger than the width of the power input coupler by 10%, 20%, 30%, 40%, 50%, 60%, 70%, 80%, 90%, 100%, or more, or a range or ranges selected from a combination of any of the aforesaid values.

In example embodiments, the platform surface has a depth, measured in a direction parallel to the first direction and/or the second direction, which is comparable or equal to the width of the platform surface. For example, the depth of the platform surface may be larger than the depth of the power input coupler by 10%, 20%, 30%, 40%, 50%, 60%, 70%, 80%, 90%, 100%, or more, or a range or ranges selected from a combination of any of the aforesaid values.

In example embodiments, for example, power connectors conforming to IEC standards, for example, types A, B, C etc., the power input coupler comprises an insulated portion on which the plurality of rigid conductor pins is mounted. In example embodiments where the power input coupler is configured as a power plug, the insulated portion protrudes away from the first housing portion and extends in the first direction as protruding pins such that the protruding insulated portion is intermediate the protruding pins and the back surface of the first housing portion. In these embodiments, the insulated protrusion and the plurality of rigid conductor pins are received in a closely fitted manner, respectively, by an inner peripheral wall of a power socket and the female connectors of the power socket wherein the weight of the load and the apparatus is supported by the peripheral wall and the female conductors in cooperation. In example embodiments, the apparatus is compact and has a palm-sized main housing such that each dimension of the main housing is comparable or shorter than the palm of an average adult, for example, equal or less than 10 cm. An example to enhance compactness is to configure the platform and the power input coupler such that an extension of the platform surface intersects the insulated portion of the power input coupler which surrounds the conductors.

In example embodiments, the power input coupler is detachable from the apparatus. To facilitate detachable reception of a power input coupler, the first housing portion includes a power coupler receptacle which is configured to detachably receive a power input coupler.

In example embodiments, the first housing portion comprises a front panel on which the front surface is defined, a back panel on which the back surface is defined, and a peripheral panel interconnecting the front panel and the back panel. In example embodiments, the peripheral wall is integrally formed with the front panel and defines a back-panel receptacle.

In example embodiments where the first housing portion is configured to include a power coupler receptacle, the power coupler receptacle is formed on the back panel. The back panel is configured as a power coupler receptacle and comprises a base portion and a peripheral portion surrounding the base portion. The base portion is a panel portion which is surrounded by the peripheral wall of the first housing portion. A plurality of apertures is formed on the base portion and the apertures are configured to permit a portion of the power input terminals to expose on and be contactable on the base portion. The power input terminals may be configured as resilient contacts which resiliently deformable in the first and second directions. The apertures may be sealed to improve water tightness while allowing exposure of the power input terminals for contact by a detachable power input coupler.

The power coupler receptacle comprises retention means to retain a detachable power input coupler in a closely fitted manner. In example embodiments, the power coupler receptacle comprises a pair of flanges 118 wherein the flanges are spaced from the base portion in the first direction and are distributed in parallel on two sides of the exposed contacts. The flanges are configured as guidance means to guide entry of the detachable power input coupler into operation position. The peripheral portion defines an entry aperture through which the detachable power input coupler is to enter into the power coupler receptacle. In example embodiment, the entry aperture is on the bottom side of the apparatus and adjacent the bottom surface of the second housing portion. When the detachable power input coupler is in its operation position in the power coupler receptacle, the power input coupler is firmed held by the power coupler receptacle, with the power input terminals urging against corresponding contacts on the detachable power input coupler to make electrical contact therewith.

In example embodiments, the apparatus is configured as a toothbrush charger for wireless charging of an internal battery which is a rechargeable battery inside the toothbrush. The toothbrush comprises a main housing inside which a motor, a toothbrush head driven by the motor, a rechargeable battery and charging circuitry are disposed. The charging circuitry comprises an inductive element comprising a coil which is configured to couple power from an external power source for charging the internal battery. The main housing is elongate and extends along a longitudinal axis which is a center axis and comprises an indentation on its bottom portion. The indentation is defined by a peripheral wall which surrounds the center axis and extends in an axial direction to define an axial indentation. The axial indentation is configured such that the peripheral wall defining the indentation is in abutment with the protruding stud 132 of the apparatus to facilitate power coupling from the power supply apparatus to the toothbrush, as shown in FIG. 10. The power supply apparatus 100 and the toothbrush as an example load is configured such the load is movable in a first axial direction to enter into power coupling engagement and in a second axial direction opposite to the first axial direction to leave power engagement. The axial direction is defined by a center axis of the toothbrush and/or the center axis of the power output coupler.

The example apparatus 200 of FIG. 11 has all features of the apparatus 100, except that the secondary housing portion is more compact and has a longer bottom surface which is substantially flat so that the apparatus can rest more squarely on a flat supporting surface. As shown in FIG. 11, the first power coupler 140 comprises a pair of pins 142 which forms part of a standard electrical plug configured for making electrical connect with a power source to obtain input power.

While the present disclosure has been made with reference to the embodiments and example configurations, the embodiments and example configurations are for examples only and are not intended to be restrictive.

The invention claimed is:

1. A power supply apparatus comprising a first power coupler on a first housing portion, a second power coupler inside a second housing portion, and electronic circuitry interconnecting the first power coupler and the second power coupler;

wherein the first power coupler is a power input coupler which is configured for moving in a first direction in order to enter into physical and electrical connection with a power outlet to receive input power;

wherein the second housing portion comprises a platform which is configured for supporting an electrical load and an internal compartment in which the second power coupler is housed, the platform having a platform surface which is parallel to the first direction and extends away from the first power coupler, the second power coupler being a power output coupler;

wherein the electronic circuitry is configured for converting the input power into output power which is suitable for wireless transfer across the second housing portion;

wherein the first housing portion is intermediate the second housing portion and the first power coupler;

wherein the first power coupler is configured to cooperate with the power outlet so that the second housing is elevated in a cantilever configuration above a base surface when the power input coupler is attached to a wall-mounted power outlet;

wherein the first housing portion comprises a front panel having a front panel surface which is adjacent the platform surface and wherein the front panel surface projects for a height above the platform surface when the apparatus is resting on a horizontal surface and with the bottom surface in abutment with the horizontal surface and supporting the weight of the apparatus; and wherein the apparatus comprises a load retention structure which protrudes orthogonally from the platform surface, and wherein the load retention structure is oppositely facing the front panel surface.

2. The apparatus according to claim 1, wherein the second housing portion comprises a bottom surface, and wherein the platform has a platform surface which is configured to support the load such that the platform surface is horizontal when the bottom surface is resting on a horizontal surface to support the weight of the apparatus.

3. The apparatus according to claim 1, wherein the first power coupler is configured to approach the power outlet in the first direction and the platform surface extends in the second direction to project away from the first housing portion, the second direction being opposite to the first direction.

4. The apparatus according to claim 1, wherein the power input coupler has a height and the height of the panel surface which projects above the platform surface is a fraction of the height of the power input coupler; and/or wherein the front panel surface and the platform surface is integrally formed.

5. The apparatus according to claim 1, wherein the load retention structure is made of a magnetic permeable material and surrounds the power output coupler.

6. The apparatus according to claim 5, wherein the power output coupler is a magnetic limb of a transformer.

7. The apparatus according to claim 1, wherein the front panel surface and the platform surface is integrally formed.

8. The apparatus according to claim 1, wherein the second housing portion comprises an upper panel which defines the platform surface and a lower panel which defines a bottom surface, wherein the upper panel and the lower panel cooperate to define a circuitry compartment inside which the electronic circuitry is housed, and wherein a plurality of conductors extends through the front panel to interconnect the electronic circuitry and the power input coupler.

9. The apparatus according to claim 1, wherein the first housing portion comprises a back panel which cooperate with the front panel to define the first housing portion, and wherein a power coupler receptacle is formed on the back panel for detachable reception of a detachable power input coupler.

10. The apparatus according to claim 9, wherein a plurality of resilient electrical contacts is mounted on the front panel, and wherein the plurality of resilient electrical contacts projects through the back panel and is configured for making electrical contact with the detachable power coupler.

11. The apparatus according to claim 1, wherein the first housing portion comprises a peripheral wall and the second housing portion comprises a peripheral wall, and wherein the peripheral wall of the first housing portion and the peripheral wall of the second housing portion are integrally formed.

12. The apparatus according to claim 1, wherein the power output coupler and the platform surface cooperate to define a docking structure for holding a load.

13. The apparatus according to claim 1, wherein the load has an indented housing and the power output coupler is configured to engage with the indented housing to retain the load.

14. The apparatus according to claim 1, wherein the apparatus is configured as a power supply of an electric toothbrush.

15. An electric toothbrush power supply apparatus comprising a main housing having a first power coupler on a first housing portion, a second power coupler inside a second housing portion, and electronic circuitry interconnecting the first power coupler and the second power coupler;

wherein the first power coupler is a power input coupler which is configured for moving in a first direction in order to enter into physical and electrical connection with a power outlet to receive input power;

wherein the second housing portion comprises a platform which is configured for supporting an electrical load in the form of an electric toothbrush and an internal compartment in which the second power coupler is housed, the platform having a platform surface which is parallel to the first direction and extends away from the first power coupler, the second power coupler being a power output coupler;

wherein the electronic circuitry is configured for converting the input power into output power which is suitable for wireless transfer across the second housing portion;

wherein the first housing portion and the second housing portion are integrally joined and the main housing is configured to be water-proof, and the first housing portion is intermediate the second housing portion and the first power coupler, wherein the first power coupler is configured to cooperate with the power outlet so that the second housing is elevated in a cantilever configuration above a base surface when the power input coupler is attached to a wall-mounted power outlet, wherein the first power coupler is configured to approach the power outlet in the first direction and the platform surface extends in a second direction to project away from the first housing portion, the second direction being opposite to the first direction; and wherein the first housing portion extends in a third direction which is orthogonal to the first direction and the second direction to form a partition between the power output coupler and the power input coupler, the partition projecting beyond the platform surface to define a splash guard between the power output coupler and the power input coupler configured to mitigate splashes of conductive liquid into the power outlet, the height of the partition being twice the axial height of the power output coupler.

16. The apparatus according to claim 15, wherein the second housing portion comprises a bottom surface, and wherein the platform surface is configured to support the electrical load such that the platform surface is horizontal when the bottom surface is resting on a horizontal surface to support the weight of the apparatus.

17. The apparatus according to claim 15, wherein the first housing portion comprises a peripheral wall and the second housing portion comprises a peripheral wall, and wherein the peripheral wall of the first housing portion and the peripheral wall of the second housing portion are integrally formed.

18. The apparatus according to claim 15, wherein the power output coupler and the platform surface cooperate to define a docking structure for holding the electrical load.

19. The apparatus according to claim 15, wherein the load has an indented housing and the power output coupler is configured to engage with the indented housing to retain the electrical load.

* * * * *